E. B. PHILLIPS.
SPRING LEAF SEPARATOR.
APPLICATION FILED NOV. 18, 1913.

1,177,352. Patented Mar. 28, 1916.

ATTEST

INVENTOR
ELBERT B. PHILLIPS
By Fisher Moser ATTYS.

UNITED STATES PATENT OFFICE.

ELBERT B. PHILLIPS, OF CLEVELAND, OHIO, ASSIGNOR TO FREDERICK KNOWLSON, OF ANN ARBOR, MICHIGAN.

SPRING-LEAF SEPARATOR.

1,177,352.   Specification of Letters Patent.   Patented Mar. 28, 1916.

Application filed November 18, 1913. Serial No. 801,705.

*To all whom it may concern:*

Be it known that I, ELBERT B. PHILLIPS, a citizen of the United States, residing at Cleveland, in the county of Cuyahoga and State of Ohio, have invented certain new and useful Improvements in Spring-Leaf Separators, of which the following is a specification.

This invention relates to spring leaf separators, and the device is an improvement in that class of tools having wedges or tapering jaws for separating the leaves of a laminated spring to permit oiling or lubrication thereof, substantially as herein shown and described and more particularly pointed out in the claims.

In general, the object of this invention is to provide a simple and inexpensive tool adapted to assure proper entrance of a pair of wedges between any two adjacent leaves of a laminated spring and to permit a quick and convenient adjustment and a powerful action of the wedges to separate the leaves without injury.

Figure 1:
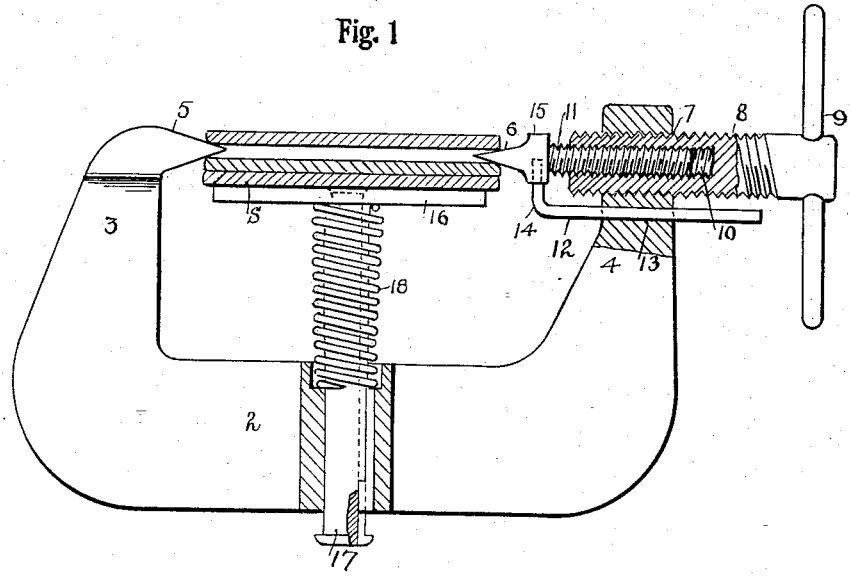
Figure 2:
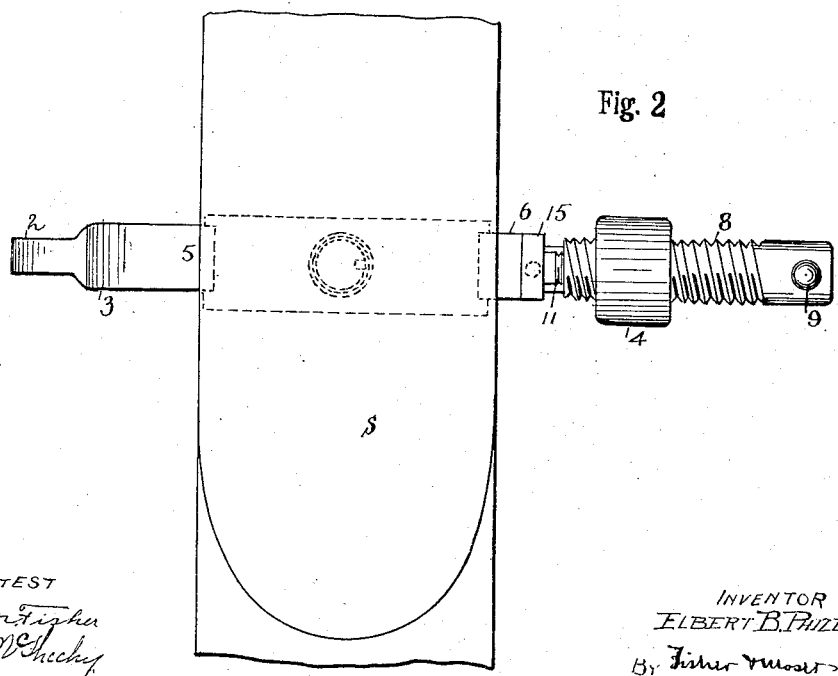

In the accompanying drawings, Figure 1 is a side elevation and sectional view of my improved spring leaf separator in operating engagement with a laminated spring. Fig. 2 is a plan view of the device.

The separator comprises a yoke or U-shaped body 2, having two integral arms 3 and 4 of tapering form and wider at their base than at their ends to give strength and rigidity to the body and to resist the spreading strains at the outer ends of said arms which carry the wedges 5 and 6 respectively. Wedge 5 is shown as an integral part of arm 3, whereas the other arm 4 is provided with a screw-threaded opening 7 in which a screw 8 is mounted, and a handle 9 is provided at the outer end of said screw to rotate the same. The inner end of said screw has a threaded bore 10 to receive and support the screw-threaded stem 11 of wedge 6, and the external threads of the screw 8 and the stem 11 are made right and left, or of different pitch, respectively, to cause an advance movement of stem 11 relatively to screw 8. To make this differential movement possible before the wedge 6 is engaged with the spring S it is essential that rotation of stem 11 be prevented, which result is obtained by a round rod 12 slidably engaged within a passage 13 in arm 4 at a point beneath screw 8. Rod 12 has a right-angled end 14 affixed within the shouldered portion 15 of wedge 6, and the rod is relatively much longer than the stem 11 to accommodate the differential movements of the screw and stem and still retain slidable engagement with arm 4. This arrangement of parts affords a wide range of adjustment of the wedges to springs of different widths, and each adjustment may be obtained very quickly by a relatively few turns of the handle.

In applying the tool to the spring —S— it is esential that both wedges shall come with their entering edges directly parallel and opposite the same parting line between any two superposed spring leaves and not opposite different parting lines. To facilitate this placement of the wedges, I mount a self-adjusting leveling member 16 opposite the wedges, said member having a stem 17 slidably splined within the body of yoke 2 and provided with a coiled spring 18 about the stem to seat said member against the spring S. A slight application of pressure will cause the leveling member to yield when it is engaged with either the top or bottom laminations of the spring and the operator is enabled to place both wedges with accuracy and despatch opposite any desired parting line, or in other words between any two adjacent spring leaves. Setting of the wedges at any desired parting line may be done by holding the body of the device in one hand and separation of the leaves by the wedges is accomplished by rotating screw 8 with the other hand.

What I claim is:

1. A separator for a laminated spring, comprising a yoke having two oppositely-related wedges, means to advance one wedge in respect to the other, and means to aline the laminated spring parallelly with the said wedges.

2. A separator for a laminated spring, comprising a body having arms each provided with a wedge, a movable support for one of said wedges and an adjustable leveling device mounted on said body opposite the wedges.

3. A spring leaf separator, comprising a yoke-shaped body having wedges oppositely disposed and movably-related, and a self-adjusting leveling device on said body opposite said wedges.

4. A separator for a laminated spring, comprising a body having opposed wedges, means to impart movement to one of said wedges, a leveling member, and a spring support for said member.

5. A separator for a laminated spring, comprising a body having movably-related wedges, a leveling member having a stem slidably seated within said body, and a spring engaging said member.

6. A spring separator, comprising a yoke provided with a wedge on one arm thereof, a threaded opening on the other arm, an internally and externally threaded sleeve mounted in such opening, a second wedge, a threaded stem attached thereto and received in said sleeve, and a guide slidably mounted in said yoke parallel to said stem and sleeve and attached to said second wedge to prevent the same from rotating.

7. A separator for a laminated spring comprising a yoke, a pair of wedges, a screw-threaded stem for one of said wedges, an externally-threaded member mounted upon said yoke having a threaded bore to receive said stem and the respective threads of said members and stem being right and left threads, and a rod slidably engaged with said yoke and affixed to the wedge having said stem.

In testimony whereof I affix my signature in presence of two witnesses.

ELBERT B. PHILLIPS.

Witnesses:
R. B. MOSER,
E. M. FISHER.

Copies of this patent may be obtained for five cents each, by addressing the "Commissioner of Patents, Washington, D. C."